(12) United States Patent
O'Brien

(10) Patent No.: US 6,836,098 B1
(45) Date of Patent: Dec. 28, 2004

(54) BATTERY CHARGING METHOD USING SUPERCAPACITORS AT TWO STAGES

(76) Inventor: Robert Neville O'Brien, 2614 Queenswood Dr., Victoria, BC (CA), V8N 1X5

( * ) Notice: Subject to any disclaimer, the term of this patent is extended or adjusted under 35 U.S.C. 154(b) by 51 days.

(21) Appl. No.: 10/457,377

(22) Filed: Jun. 10, 2003

(51) Int. Cl.[7] .................. H01M 10/44; H01M 10/46
(52) U.S. Cl. ................................................. 320/166
(58) Field of Search ............... 320/116, 118, 320/126, 129, 139, 141, 145, 166, 167

(56) References Cited

U.S. PATENT DOCUMENTS

| | | | |
|---|---|---|---|
| 4,016,473 A | 4/1977 | Newman | |
| 4,829,225 A | 5/1989 | Podrazhansky et al. | |
| 5,621,297 A | 4/1997 | Feldstein | |
| 5,710,504 A | 1/1998 | Pascual et al. | |
| 6,118,678 A * | 9/2000 | Limpaecher et al. | 320/166 |
| 6,194,093 B1 | 2/2001 | O'Brien | |
| 6,204,638 B1 * | 3/2001 | Nishioka et al. | 320/139 |
| 6,404,165 B1 * | 6/2002 | Shinpo et al. | 320/116 |
| 6,556,424 B2 | 4/2003 | O'Brien | |

* cited by examiner

Primary Examiner—Edward H. Tso

(57) ABSTRACT

A method for rapidly charging an electrically rechargeable battery or batteries string by a series of charging pulses, interspersed with battery discharge pulses effective to eliminate undesired concentration polarization by substantially thinning or dispelling electrical double layers and diffusion layers at electrodes contacted by an aqueous electrolyte solution. In contrast to related schemes which intermittently discharge a limited portion of battery charge to a load comprising components featuring significant resistance and/or inductance, in this case supercapacitors receive the reversedly pulsed depolarizing discharge.

3 Claims, 1 Drawing Sheet

BATTERY CHARGING METHOD USING SUPERCAPACITORS AT TWO STAGES

BACKGROUND OF THE INVENTION

1. Technical Field

In general, this invention relates to battery chargers, and more particularly to a method of charging a secondary battery or string of batteries by the use of pulses of direct current, as opposed to continuous current, specifically where a repeated step in enactment of the method involves pulsed discharges of current taken from the battery or batteries string, interspersing such discharging pulses between charging pulses. Another aspect of general pertinence concerns timely switching back and forth between parallel aud series arrangements of circuitry. Types of batteries chargeable in accordance with the method to be described may include, but are not confined to, batteries having magnetized current collectors, such as those described in U.S. Pat. No. 6,194,093 B1 by O'Brien, the same inventor as at present.

BACKGROUND OF THE INVENTION

2. Description of Related Art

Descriptions of battery chargers delivering charging current pulses interspersed by pulsed battery discharges are extant, including chargers devised to procure depolarization of batteries by means of the discharges. Such depolarization mitigates adverse consequences of high current rapid charging, including elevated internal energy losses, overheating, and gas evolution dangerously building up pressure within battery casings. In background discussion for U.S. Pat. No. 4,829,225 by Podrazhansky et al., earlier implementation of a reversedly pulsing approach to battery charging was credited to others, eg., Burkett et al.

U.S. Pat. No. 4,829,225 particularly teaches "charging a battery by providing a charge pulse to the battery, followed immediately by a depolarization pulse created by allowing the battery to discharge across a load, followed by a stabilization period, and repeating this sequence cyclically until the battery is charged." The same patent also suggests that the "discharge load may be provided by a transistor . . . controlled by the system control logic . . . to provide a variable resistance." There is ill suggestion by Podrazhansky et al. that the component loaded by discharge pulses should be a supercapacitor—preferably employing the new supercapacitors with magnetized parts that O'Brien describes in U.S. Pat. No. 6,556,424 B2 which is herewith incorporated by reference.

In general, one kind of distinction thought helpful for distinguishing between the reversedly pulsing (charging/discharging) arrangements of some inventions in this field, from others, is the distinction concerning the specific type of component or locally grouped set of components to which discharge pulses from a battery or, batteries string are to be delivered. Thus, on the point that discharges are delivered to a variable-resistance transistor for the Podrazhansky et al battery charger, more of a family resemblance thereto than strong distinction therefrom is perceptible in the pulsed charger described in U.S. Pat. No. 5,621,297 by Feldstein, who discloses means whereby discharge pulses flow through "isolation diodes" to "discharge current resistors", as and when permitted by transistorized control. Podrazhansky et al and Feldstein therefore would likely concur in accepting the inevitable energy losses associated with delivering battery current to resistors. Acceptance of degradation of electric energy to heat is not part of the approach adopted for the present invention, however, albeit also involves interspersal of battery current discharge pulses between battery charging pulses.

Another approach perceptible in the background art is to locally group inductors and ordinary capacitors in suitably switched circuitry, so as to use a subset of inductors and capacitors both to discharge pulses of charging current into a battery or batteries string, and to intermittently receive pulses of battery current discharged thereto. This approach seems to use inductors and capacitors, basically, in substitution for the kind of use of resistors as has been mentioned above with regard to the Podrazhansky et al and Feldstein inventions. Both W. Newman in U.S. Pat. No. 4,016,473 and Pascual et al in U.S. Pat. No. 5,710,504 describe using inductors and capacitors grouped to intermittently receive delivery of battery discharge pulses.

When current flowing through an inductor is switched off, there will of course occur a collapsing magnetic field, causing dissipation of heat in local conductors, which is as truly an instance of energy degradation as is that occurring with components more ostensibly identified as resistors. The difference that resistors generate heat during the period of time when current is flowing, whereas inductors generate heat immediately after flowing current is interrupted, is not of significance to the point presently made, that the substitution for resistors that appears adopted by Newman and by Pascual et al incurs energy loss because of switching off inductors. Moreover, neither Newman nor Pascual et al specify a requirement that the capacitors they use to both transmit and receive pulsed current should be supercapacitors, as specified hereinafter as an essential feature of the present invention.

The abovecited Pascual et al. invention, which does not in every embodiment require using inductors to the same extent Newman uses them, is ostensibly concerned with art "active equalization" method whereby batteries in a long string way be equalized. The inference is not avoidable, however, that an incidental effect of the method of equalization proposed by Pascual et al. is depolarization procured in a substantially similar manner as for the several battery charger patents of the background art.

The practice of discharging depolarization pulses from a battery by use of a special charger is applicable to secondary electrochemical cells of well known types having solid-phase electroactive materials for anodes and cathodes, in contact with liquid-phase, usually aqueous, electrolyte solutions, noting that such cells operate at temperatures below melting points of the electroactive materials involved. High temperature cells using electroactive materials such as sodium and sulfur in a molten flowing state do not incur the identical entire set of problems addressed by pulsed charging methods, including, for example, the battery life cycle problem of shedding of electroactive materials from typical metal electrode grids or current collectors, which can occur due to the difference in thermal expansion properties between the grids and/or current collectors on the one hand, and the electroactive materials on the other hand. The present invention applies to the same types of batteries as do the background art inventions, and like them helps prolong battery life cycles by avoiding the high continuous current method of charging that exacerbates a tendency of overheated electrode assemblies to shed electroactive materials.

BRIEF SUMMARY OF THE INVENTION

Objects of this invention include providing an improved method and apparatus for rapidly charging an electrically rechargeable battery or batteries string by a series of charging pulses, interspersed with battery discharge pulses effective to eliminate undesired concentration polarization, by substantially thinning or dispelling electrical double layers and diffusion layers at electrodes contacted by an aqueous electrolyte solution. Concurrent objects include prevention of overheating batteries, and of dangerously built-up pressure from gas evolution. A major general aim is to conserve energy in the course of enacting intermittent discharge pulses interspersed with charging pulses. An important specific object of invention is to effect discharge pulses in such a manner that electrical energy is not degraded to heat energy either by dissipation in resistive elements or in consequence of magnetic field collapses when local currents suddenly cease. Electrical energy of discharge pulses is to be stored temporarily in supercapacitors that will experience no significant heating during their service in accordance with the method of the invention.

For a preferred embodiment of the invention, the new supercapacitors with magnetized parts shall be employed to advantage; however, supercapacitors such as those to which the recent invention of supercapacitors with magnetized parts applies as an improvement will be serviceable in other embodiments, without necessity of magnetized parts. Regarding the preferred embodiment, permanent magnet materials for the pertinent parts will have been pre-selected for ability to withstand predetermined electrical conditions and current-associated magnetic fields, without incurring de-magnetization. A preferred embodiment charger, moreover, is expected to be most effective when the type of battery charged is one having magnetized current collectors.

Intermittent charging and discharging of electronic components is to be performed for three basic sections or subassemblies of grouped features, nominally referred to respectively using the terms "first stage", "second stage", and "third stage", where the key feature of the third stage is a temporarily emplaced actual battery or batteries string to be brought up to full charge according to the method of the invention, and where the key feature of the first stage is a supercapacitor with a per discharge releasable capacity that may be scaled in typical instances at from about 10% to 25% of the total amount of energy stored by the end of the process in both the second and third stages. The first stage super-capacitor is charged by current from any suitable DC current source, such as a rectifier drawing mains AC current, or a generator.

The abovestated limitation pertaining to capacity of the first stage supercapacitor logically suggests needing from at least four to ten charging/discharging cycles of the first stage supercapacitor, to enact a typical complete battery charging process very rapidly. Actual practice would not necessarily be limited to a particular number of first stage discharges, however, because of variables in sizes and types of battery strings, aid rising costs of larger size supercapacitors, the pseudo-capacitance procuring materials in which are quite expensive.

Multiple surges of current to be periodically discharged from a first stage super-capacitor will be delivered into and through the array of second stage supercapacitors wherein they are alternately electrically connectable amongst one another in either a series or else parallel arrangement, besides being connected alternately in series or in parallel to the third stage, which in its instance when several batteries are stringed is also variably internally connected with the batteries in series or parallel, wholly or partially. Second stage super-capacitors should have higher energy storage capacities when batteries requiring relatively more protection from large charging surges are charged, and may have relatively lower capacities when not so much surge protection is needed by a particular battery type. An estimated 10% to 50% of the amount of energy the third stage (battery or batteries string) will ultimately store may be a suitable second stage capacity, but again the size and capacity for supercapacitors in the second stage may in practice vary for a number of reasons. It is generally desirable that there should be a possibility, at conclusion of the process, of storing energy in the second stage supercapacitors array. For example, assuming enactment of a complete battery charging procedure that involves ten discharges of a first stage supercapacitor, the last depolarization pulse of energy back to the second stage supercapacitors array from the third stage batteries string may be left stored in the second stage supercapacitors array for future use of any kind, including delivery in a manner to be described hereinafter to a load that may be the same electric motor the charged-up batteries are to power.

Regarding series and parallel arrangement alternatives amongst the second stage supercapacitors, they will have been electrically connected to one another in series, and in series to the third stage batteries also in series, just prior to receiving a surge of energy discharged from the first stage supercapacitor, the surge feeding both into the second stage supercapacitors array and a portion thereof passing therethrough to the third stage. The slope of the energy surge from a first stage discharge should be detected by a suitable sensor, used to ascertain when the surge subsides from peak energy transfer.

Charging pulse surge slope information should be fed to a microprocessor control unit responsible for switching electrical connections from series to parallel arrangements. At the same time the arrayed supercapacitors are in parallel with one another, a third stage batteries string may have some rather than necessarily all its batteries changed from series to parallel interconnection, depending on how close to completion is the overall charging procedure. During the initial and peak transfer phase of energy discharged by each pulse from the first stage supercapacitor, the second stage supercapacitors array operates in a filtering or smoothing mariner, so to speak, which protects the third stage batteries from deleterious consequences of a sudden power surge, such as overheating and damage to electrode structure which could otherwise occur from a similarly strong surge but absent the intervening second stage super-capacitors. During the lattermost portion of energy transfer from a particular discharge of the first stage supercapacitor, parallel interconnecting arrangements can procure an equalizing effect and reasonable speed and voltage of charging of the batteries.

Upon virtual exhaustion of a discharge from the first stage supercapacitor, this will be sensed by a suitable sensor and a switch will operate to disconnect the first stage from the remaining-connected second and third stages. During the period of its disconnection from them is when the first stage supercapacitor will be recharged from the DC source, and while this is happening a portion of the energy already received by the third stage batteries will be pulsed back into the second stage supercapacitors array in generally a similar manner as for the known depolarizing pulses in abovecited background art invention—with the notable exception that here the so-called "bucking voltage" energy definitely is not dissipated in heat-generating components like resistors and/or inductors, because it will be received and conserved in the supercapacitors which are the special technical feature of the second stage.

During the periods of discharging a pulse of current to the second stage array of supercapacitors from the third stage batteries, as many of the letter as are needed to be in a series mode of arrangement should be switched thereto, in order that the voltage for their discharge pulse will be well above any voltage possibly remaining at the time in the second stage supercapacitors array, which itself should briefly be left in parallel arrangement for this period of reversed discharging, which is estimated to take typically from about 10 to 15 seconds. The time needed depends on how long it takes both for electrical double layers at the battery and supercapacitor electrodes, and for the diffusion layers adjacent battery and supercapacitor electrodes, to be dispelled, thereby, in the instance of the batteries, removing the principal causes of concentration polarization.

In the instance of the supercapacitors, reducing the time constant is effected—in both instances, of magnetically enhanced batteries and magnetically enhanced supercapacitors, reducing internal resistance and preventing overheating and gas evolution. Time for dispelling diffusion layers, which is the slower attained of the two objectives here, since electrical double layers dispel more rapidly, is significantly shorter when magnetohydrodynamic stirring of an electrolyte solution is a present factor. The best contemplated way to match a shortened depolarizing discharge pulse period from the batteries is to employ supercapacitors in the second stage array which themselves feature a magnetically enhanced electrolyte convection process, by virtue of their having magnetized parts in accordance with the above cross-referenced related application, descriptive contents of which are properly incorporated herewith by reference.

Any suitable sensing means whereby a determination can be made that the diffusion layers adjacent battery electrodes have been dispelled will inform the microprocessor control unit of the fact, so that appropriate terminal reconnections readying the second stage for receipt of the next discharge pulse from the first stage supercapacitor may be made. By way of summary: while the depolarizing discharge pulse transfer of energy to the second stage array of supercapacitors from the third stage batteries takes place, the first stage supercapacitor is being brought up to its full charge state to ready it for discharge when connected again to the second stage. That re-connection should not occur until the second stage supercapacitors have been brought back again into series arrangement amongst themselves, which is best for absorbing the initial and peak transfer of energy to and through them. Their switching back to series may be initiated upon receipt of a microprocessor control unit of sensed information that a suitable amount of discharged current from the third stage say be inferred to have resulted in adequate battery depolarization for the time being.

Especially in view of extensive applicable details and options taught in prior art teachings of pulsed charging methods wherein it has been known to interperse discharge pulses from batteries, with charging pulses, now, together with a high level of skill and knowledge in the field, plus relatively recent disclosures by R. N. O'Brien (the present inventor) concerning magnetohydrodynamic stirring to reduce internal resistances of batteries and supercapacitors, it is considered instantly within the capabilities of artisans of the field, without need for undue experiment or necessity to independently discover special materials, to give engineered effect to the here-suggested present invention. For greater understanding of the suggestion, illustration by way of detailed description with reference to a schematic figure follows.

DETAILED DESCRIPTION OF THE INVENTION

Figure 1:
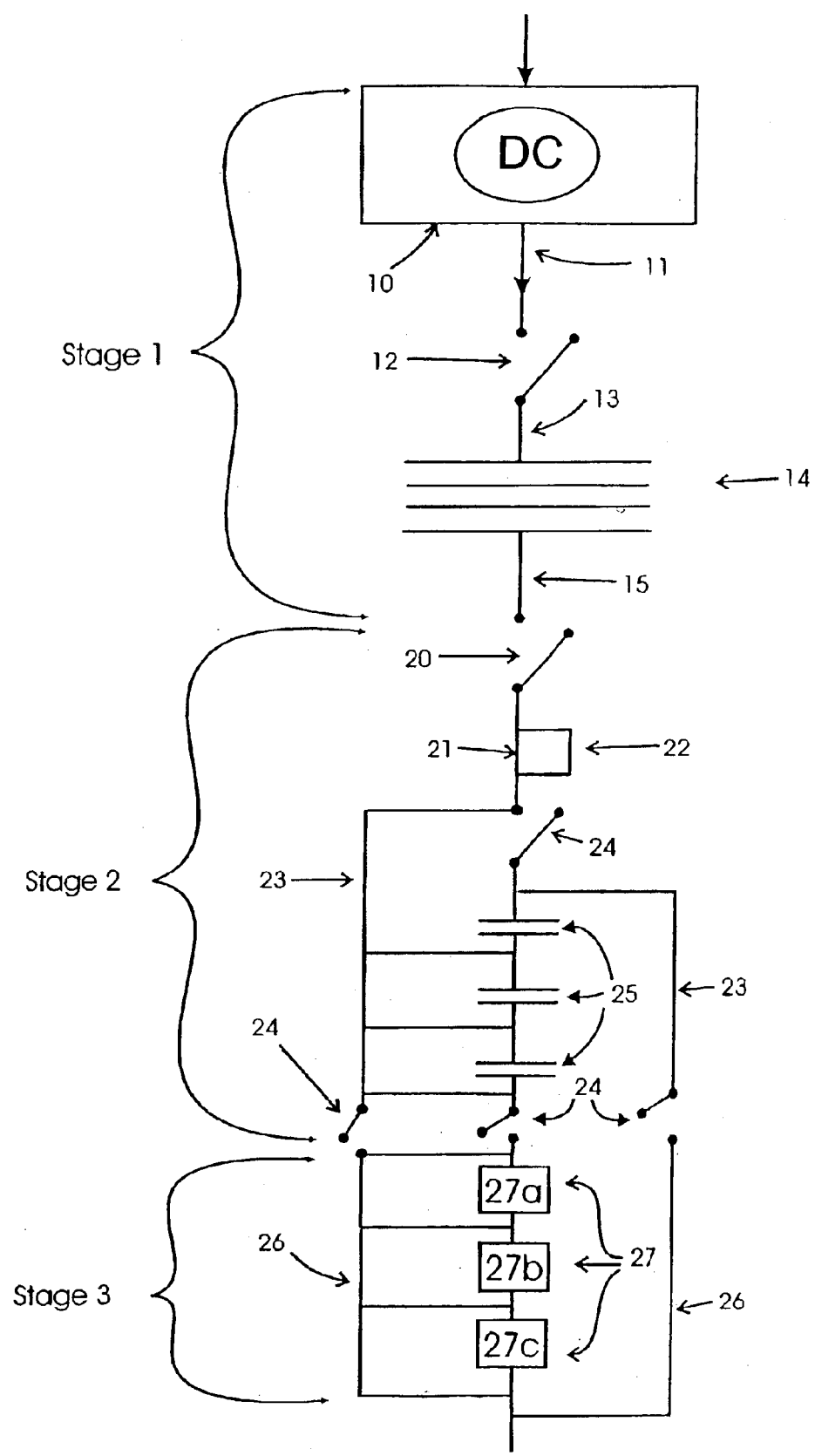
FIG. 1 is a schematic illustration to assist understanding how essential steps of the pulsed charging/discharging method of the invention can be enacted using apparatus elements that are preferably arranged basically in three stages as suggested.

With reference to the schematics of FIG. 1, certain of the enumerated figure elements group together as features representatively of and respectively belonging to each of the three basic sections or subassemblies refereed to in the SUMMARY above using the terms "first stage", "second stage", and "third stage".

Regarding the first stage, generally designated by numeral 1 at the side of a stylized "bracket" having arrowhead leadlines at top and bottom, the uppermost feature is a suitable DC current source 10, and the lowermost feature is conductor means 15 leading to the second stage. The key special feature of stage 1 is supercapacitor 14, which is intended to be charged by current drawings from source 10 through conductor means 13 when on/off switch 12 is so closed as to pass current through from conductor means 11 below source 10 in the figure. Switch 12 may be turned on and off in accordance with a pre-determined timing mechanism. Typical per discharge releasable capacity of supercapacitor 14 may be from about 10% to 25% of the total amount of energy stored by the end of the overall charging process in both the second and third stages, which, although logically suggesting supercapacitor 14 would typically be charged and then discharged from at least four to ten times for a complete battery charging process, should not be taken to mean actual practice and technical definition of the invention would necessarily be limited to a particular number of stage 1 charge/discharge cycles.

Regarding the second stage, generally designated by numeral 2 at the side of another stylized "bracket" having arrowheaded leadlines at top and bottom, the uppermost feature shown here is an on/off switch 20, which when closed allows current to discharge through conductor means 15 of stage 1, coming on into stage 2, and in so doing being subjected to measurement by means of sensor 22 shown on conductor means 21 just below switch 20. As mentioned in the above SUMMARY, what sensor 21 measures is the charging slope of the energy surge associated with a given discharge from stage 1 into stage 2.

Pulse surge slope information should be fed from sensor 22 to a microprocessor control unit, not shown but well within the art to provide and suitably arrange, and the purpose of which will be to correctly operate a system of switches yet to be described so that certain electrical connections shall be changed from series to parallel arrangements.

Continuing with regard to stage 2 features, series/parallel selection switches 24 are shown at various locations on general stage 2 conductor means 23 whereby a second stage array 25 of at least three supercapacitors is effectively interposed between stage 3 and surge-discharging supercapacitor 14 of stage 1. By commands via the microprocessor, supercapacitors 25, which will have been electrically connected to one another in series just prior to receiving a surge of energy discharged from first stage supercapacitor 14, will be re-arranged amongst one another into a parallel arrangement after the detected peak of a charging pulse surge, and in other words during the subsiding slope phase of supercapacitor 14's discharge pulse to and onwardly through them to stage 3.

Features of the third stage as illustrated and designated generally 3 by the numeral beside the corresponding stylized "bracket" for this stage are associated conductor means 26 and emplaced batteries string 27 comprising batteries 27a, 27b, and 27c, which are to be brought up to full charge according to the method of the invention. The batteries of string (or "battery pack") 27 are, like the supercapacitors of array 25, intended to also be connectable alternately in series or in parallel within their stage 3 emplacement, as well as in relation as a set to stage 2; however, and here not shown, there should preferably also be means for partial series or parallel interconnection among them, when appropriate, to accommodate the circumstances of voltage needed for brief depolarizing pulses therefrom, back into the stage 2 supercapacitors array 25, which would not be expected to always have the same amount of remaining voltage therein when receiving the discharge pulse from stage 3 batteries string 27 that will shortly be described, after immediately next reiterating an important point from the above SUMMARY.

During the initial peak transfer phase of energy discharged by a pulse from stage 1 supercapacitor 14, not only do stage 2 supercapacitors 25 operate in a manner protecting stage 3 batteries string 27 from overheating and damage to electrode structure which could otherwise occur as deleterious consequences of a sudden power surge, but battery string 27 will have been additionally protected by its own series arrangement during the peak energy transfer period, after which a parallel arrangement procures an equalizing effect and reasonable speed of completing charge acceptance.

Upon virtual exhaustion of a discharge from supercapacitor 14, sensor 22's detection of the event, via suitable microprocessor control, should then disconnect stage 1 from the remaining-connected stages 2 and 3, switch 20 turning off synchronously with switch 12 turning back on so that supercapacitor 14 will be recharged from DC source 10. It is while this is happening that a portion of the energy already charged into batteries string 27 will be pulsed back into supercapacitors array 25, in generally a similar manner as for the wide variety of pulsing chargers of abovecited and similar background art inventions—with the notable exception that here the so-called "bucking voltage" energy definitely is not dissipated in heat-generating components like resistors and/or inductors, because it will be received and conserved in the supercapacitors 27 which constitute the most special technical feature of stage 2.

Magnitudes and durations of reverse discharge pulses into array 25 from batteries string 27 should be limited to what is minimally needed in order to discharge electrical double layers at battery electrodes and to remove built-up diffusion layers in electrolyte solution adjacent battery electrodes, thereby eliminating about 99% of the undesirable concentration polarization. The period of reversed discharging per pulse is estimated to typically require from about 10 to 15 seconds, depending largely on battery drain properties, and therefore of shorter duration for notably high drain battery types. Tire exact time needed may be ascertained either in advance by routine experimentation, followed by setting of time delay switch controls, preferably built into the microprocessor unit already mentioned, or alternatively by the use of any suitable kind of direct or indirect polarization sensors (not shown) which may appropriately be used to get real-time data on the prevailing states of polarization of batteries 27a, b, and c. Furthermore, as would obviously be apparent to those of skill in the art, there clearly must always have been a cessation of any depolarizing reversed pulse from stage 3 into stage 2 before any re-commenced pulsed charging from stage 1 will have been permitted, which again is a matter of timing.

Variant Physical Apparatus Embodiments

It will be borne in mind that FIG. 1 merely supplies a schematic illustration for assistance in understanding how steps of the method of the invention proceed, viz., briefly: with charge intermittently passing from stage 1 to and through stage 2 and onward to stage 3, followed by brief and very limited reverse charge transfer back to stage 2 from stage 3, before repeating discharge from the supercapacitor 14 of stage 1.

Furthermore, what is shown pictorially in the figure should not be confused with details of a wiring diagram, and, for example, various "conductor means" shown do root represent individual wires, nor do their convergences at various spots respecting other figure elements indicate precisely where particular terminals and/or terminal leads should be. All such matters of a wiring diagram and/or actual physical apparatus depiction are herewith deliberately left to those of skill in the art to flesh out—which provision is not thought to tax their skills, providing the basic suggestion of the invention is considered followable by reference to the description and illustration supplied as above. Yet further, and importantly also noted, it is not intended that mechanically permanent affixation of any particular elements to any other(s) should be considered to have been specified by the description ard illustration here supplied.

Next, the artisans' attention is drawn to a few readily viable options respecting actual physical apparatuses which are riot specifically depicted. The emplacement of batteries at stage 3 may or may not be such as to permit easy removeability of batteries from that stage. There may be, or optionally may not be, easy disconnectability of stages 2 and 3 from one another, and/or, in turn, from stage 1, including DC current source 10, which lads already been indicated to be of no specific type. From these points it is apparent that either in whole or partially, means for carrying out the method of the invention may equally well be either portable or stationery. For example, stages 2 and 3 nay be integral with structure of an electric vehicle but they do not have to be. Were stage 3 alone, with its battery string 27, mounted in an electric vehicle, the state of the art certainly suffices for the balance of other stages (2 and 1) to be engineered into an electric vehicle charging facility wherein obvious expedients for interconnecting the stages as needed may be practiced. As another option, particularly if DC current source 10 were desired to be a combustion engine-powered generator, the whole set of cooperating stages 1, 2, and 3 could be aboard a vehicle. In other words, the invention is not to be limited to a particular mode of application, vehicular or otherwise, nor must it be used at a particular physical size scale. Sizes of apparatus could vary from small for handheld tools, other portable equipment such as wireless communicators or notebook computers, through vehicular size and upwards to industrial plant installations on land or even possibly aboard a ship, or perhaps even at a subsea colony. The foregoing ideas regarding a great variety of possible settings for using the invention are not especially exceptional by comparison with similar wide variety of applications proposed by others with related battery charging schemes.

What has been lacking in the prior art is inadequate attention to the wastage of energy accompanying use of resistors, inductors, and similar solid-state circuitry components that dissipate heat during normal operation—besides which there has been no teaching how to use supercapacitors in pulsed-type battery chargers, whereas the present invention has been described with reference to the illustrative figure so as to positively enable suggested use of supercapacitors to achieve the objects of the invention, with the most preferred supercapacitors being those of the very new type having magnetized parts. It is now apparent that, although objects of the invention are generally similar to those pursued previously by others with varying degrees of success, these objects will now be attained in a significantly simplified manner requiring fewer different types of electronic components than heretofore. Moreover, the rapid charging dune without overheating and/or other causes of possible damage to the batteries is also now done with minimal degradation of electric energy to heat, thereby truly qualifying the invention as one pertaining to conservation of practical energy supplies.

The advantages associated with using the preferred new type of supercapacitor having magnetized parts will be evident from acquaintance with the abovecited incorporated-by-reference United States patent by O'Brien. Time constants and very low internal resistance associated with that invention are understood as lending themselves superbly to enabling better practice of the present invention than would be feasible otherwise.

Furthermore, when such or similar supercapacitors used with the invention are let to retain charge therein after the associated batteries are fully charged, this means that a motor or other electrical load may be powered, if desired, with utilization of current and voltage derived both from batteries and supercapacitors.

When using charged supercapacitors to supply additional power to that from batteries, it will be borne in mind that it would be prudent to have a switch isolating the types of energy storage to limit leakage, when both are "on standby" for future use, since leakage tends to be greater from capacitors than from batteries. In general, a combined energy package comprising stages 2 and 3 as described above and retained together, especially wherein supercapacitors of stage 2 may store a quarter or more as much energy ds the batteries, provides a good combination with special utility in electric vehicle applications.

Although the invention has been described above with concise, accurate, and sufficient description by way of illustration of how principles of the invention should be applied, it will be understood that references heretofore to details of what has been suggested, described, and illustrated are not intended to rule out any unillustrated variations aid modifications which may be produced without undue experimentation while remaining within the spirit of equivalence scope of recited definition of essential features, per the following limits of the claims.

What is claimed as new is:

1. In an improved method for rapidly charging an electrically rechargeable battery or batteries string by a series of charging pulses, interspersed with battery discharge pulses effective to eliminate undesired concentration polarization by substantially thinning or dispelling electrical double layers and diffusion layers at electrodes contacted by an aqueous electrolyte solution, the steps of:

procuring a first apparatus portion stage essentially comprising a DC current source, a first stage supercapacitor, and conductor means having a first switch between said current source and said first stage supercapacitor, and a second switch between said first stage supercapacitor and a second apparatus portion stage;

procuring the second apparatus portion stage, essentially comprising an array of at least three second stage supercapacitors alternately connectable in series or parallel by means of a set of associated switches and conductor means, a sensor to detect slope of a charging pulse from said first apparatus portion stage, and microprocessor means for governing said associated switches in suitable accord with data from said sensor;

procuring a third apparatus portion stage essentially comprising a batteries string of electrical rechargeable batteries, and third stage conductor means capable of interconnecting said batteries alternately in series or parallel with one another and with said second stage supercapacitors in a suitable manner by use of said set of associated switches;

charging said first stage supercapacitor with electrical energy from said DC current source;

discharging said first stage supercapacitor through said conductor means of said first stage and thence to said second stage and thereon through to said third stage;

disconnecting said first stage from said second and third stages remaining in connection with one another while said first stage supercapacitor is recharged by reconnection to said DC current source;

discharging a limited portion of accumulated charge from said battery string of said third stage, back into said supercapacitors array of said second stage; and, repeating the cycle of discharging to said second and third stages from said first stage supercapacitor;

followed by repeating the limited discharge from said battery string a number of times which is one less time than the total number of times said first stage supercapacitor discharges to complete this method of recharging.

2. An apparatus comprising the three stages procured for carrying out the method of recharging of claim 1, wherein both said first stage supercapacitor and said second stage supercapacitors are all of a type having magnetized parts and which thereby procure short time constraints and low internal resistance due to magnetohydrodynamic stirring of an electrolyte solution in said supercapacitors of both the first and second stages.

3. The apparatus of claim 2, wherein capacity of said first stage supercapacitor is scaled from one-tenth to one-fourth the capacity of said second stage supercapacitors and third stage rechargeable batteries in combination.

\* \* \* \* \*